(12) United States Patent
Akhavan-Tafti et al.

(10) Patent No.: US 10,259,999 B2
(45) Date of Patent: Apr. 16, 2019

(54) METHOD FOR STORING AND RELEASING NANOPARTICLES

(71) Applicant: AhuraTech LLC, Howell, MI (US)

(72) Inventors: Hashem Akhavan-Tafti, Howell, MI (US); Guoping Wang, Novi, MI (US); Barry A. Schoenfelner, Saugatuck, MI (US)

(73) Assignee: AhuraTech LLC, Brighton, MI (US)

( * ) Notice: Subject to any disclaimer, the term of this patent is extended or adjusted under 35 U.S.C. 154(b) by 0 days.

(21) Appl. No.: 15/240,271

(22) Filed: Aug. 18, 2016

(65) Prior Publication Data

US 2018/0051209 A1    Feb. 22, 2018

(51) Int. Cl.
*C09K 11/88* (2006.01)
*C01G 9/02* (2006.01)
*C01G 9/08* (2006.01)

(52) U.S. Cl.
CPC .............. *C09K 11/883* (2013.01); *C01G 9/02* (2013.01); *C01G 9/08* (2013.01); *C01P 2002/54* (2013.01); *C01P 2004/60* (2013.01); *C01P 2004/61* (2013.01); *C01P 2004/62* (2013.01); *C01P 2004/64* (2013.01)

(58) Field of Classification Search
None
See application file for complete search history.

(56) References Cited

U.S. PATENT DOCUMENTS

| | | | |
|---|---|---|---|
| 7,991,421 B2 | 8/2011 | Gandhi et al. | |
| 7,994,421 B2 | 8/2011 | Williams et al. | |
| 8,232,221 B2 | 7/2012 | Kuznicki | |
| 8,313,797 B2 | 11/2012 | Mack et al. | |
| 8,383,674 B1 | 2/2013 | Posada | |
| 8,491,818 B2 | 7/2013 | Shih et al. | |
| 8,845,927 B2 | 9/2014 | Breen et al. | |
| 9,187,625 B2 | 11/2015 | Han et al. | |
| 9,314,849 B2 | 4/2016 | Tracy et al. | |
| 2004/0180785 A1 | 9/2004 | Jiang et al. | |
| 2006/0083694 A1 | 4/2006 | Kodas et al. | |
| 2006/0246121 A1 | 11/2006 | Ma et al. | |

(Continued)

FOREIGN PATENT DOCUMENTS

CN     103639418 A     3/2014

OTHER PUBLICATIONS

Li, Yaoxia et al., "Synthesis of ZnS Nanoparticles Into the Pore of Mesoporous Silica Spheres," Materials Letters, 2009, vol. 63, No. 12, pp. 1068-1070.

(Continued)

*Primary Examiner* — Timothy H Meeks
(74) *Attorney, Agent, or Firm* — Harness, Dickey & Pierce, P.L.C.

(57) ABSTRACT

A method is presented for storage and on-demand release of nanoparticles. Nanoparticles produced by this method can be dried and stored for an extended period of time and subsequently released on-demand in a solvent of choice to form stable suspensions without the need for additional surfactants or stabilizers and without any loss in functionality or material properties. This method can be used to store various categories of nanomaterials including metals, metal oxides, metal chalcogenides, magnetic, polymeric and semiconductor nanoparticles.

25 Claims, 7 Drawing Sheets

(56) References Cited

U.S. PATENT DOCUMENTS

| | | | | |
|---|---|---|---|---|
| 2007/0265357 | A1* | 11/2007 | Iversen | B01D 9/005 516/1 |
| 2008/0193766 | A1* | 8/2008 | Anderson | B01J 2/006 428/403 |
| 2009/0098574 | A1 | 4/2009 | Brisson et al. | |
| 2010/0224831 | A1 | 9/2010 | Woo et al. | |
| 2010/0231433 | A1 | 9/2010 | Tishin et al. | |
| 2014/0124696 | A1* | 5/2014 | Guo | H01F 1/342 252/62.54 |
| 2014/0221199 | A1 | 8/2014 | Devi et al. | |
| 2015/0079310 | A1 | 3/2015 | Park et al. | |
| 2015/0239049 | A1* | 8/2015 | Tracy | B22F 9/24 75/371 |

OTHER PUBLICATIONS

International Search Report and Written Opinion of the International Searching Authority regarding PCT/US2017/037667 dated Sep. 26, 2017.

International Search Report and Written Opinion of the International Searching Authority regarding PCT/US2017/037675 dated Sep. 27, 2017.

Bol, A., et al "Luminescence quantum efficiency of nanocrystalline ZnS:Mn2+, surface passivation and Mn2+concentration" J. Phys. Chem. B. 105(42) 10197-10202 (2001).

Corrado, C., et al "Synthesis, structural, and optical properties of stable ZnS:Cu, Cl nanocrystals" J. Phys. Chem A. (2009).

Li, H., et al "Non-heavy-metal ZnS quantum dots with bright blue photoluminescence by a one-step aqueous synthesis" Nanotechnology, 2007, 18(20), 205604 (2007).

Manzoor, K., et al "Synthesis and photoluminescence properties of ZnS nanocrystals doped with copper and halogen" Mater. Chem. Phys. 2003, 82, pp. 718-725 (2003).

Peng. W. Q., et al "Synthesis and photoluminescence of ZnS:Cu nanoparticles" Optic. Mater. 2006, 29, 313-317 (2006).

Mehta, S.K. et al "Evolution of ZnS nanoparticles via facile CTAB aqueous micellar solution route: a study on controlling parameters" Nanoscale Res. Lett. 2009, 4, 17-28 (2009).

Dang, T. et al "The influence of solvents and surfactants on the preparation of copper nanoparticles by a chemical reduction method" Ad. Nat Sci. Nanosci. Nanotechnol. 2011, 2, 0254004 (2011).

Chandrasekaran, P. et al "The effect of various capping agents on the surface modifications of sol-gel synthesized ZnO nanoparticles" J. Alloy. Compd. 2012, 540, 89-93 (2012).

Tiwari, A., et al "Synthesis structural and optical characterization of nanocrystalline ZnS:Cu embedded in silica matrix", Curr. Appl. Phys. 2012, 12(3), 632-636 (2012).

Nath, S. et al "Green luminescence of ZnS and ZnS: Cu quantum dots embedded in zeolite matrix" J. Appl. Phys. 2009, 105, 094305 (2009).

Severance, M. "Nanocrystalline Zeolintes: Synthesis, Mechanism, and Applications", Doctoral dissertation, The Ohio State University (2014).

Shen, L. et al "Growth and stablization of silver nanoparticles on carbon dots and sensing application" Langmuir, 2013, 20(52), 16135-16140 (2013).

Nistor, S. V. et al., "Local Structure at Mn2+ Ions in Vacuum Annealed Small Cubic ZnS Nanocrystals Self-Assembled Into a Mesoporous Structure," Journal of Nanoscience and Nanotechnology, vol. 11, pp. 9296-9303 (2011).

Haranath, D., et al., "Controlled Growth of ZnS:Mn Nanophosphor in Porous Silica Matrix," Journal of Applied Physics, vol. 96, No. 11, pp. 6700-6705 (Dec. 2004).

Berezin, M.Y., "Nanotechnology for biomedical imaging and diagnostics: from nanoparticle design to clinical applications", John Wiley & Sons, (2014) pp. 17, 32, 41, 91, 133, 137, 202, 244 & 417.

Ho, Chih-Ming., "Micro/Nano technology systems for biomedical applications: Microfluidics, optics and surface chemistry",Oxford, (2010); pp. 10, 14, 16, 17, 352, 357 & 361.

Carey, G.H. et al, "Cleavable Ligands Enable Uniform Close Packing in Colloidal Quantum Dot Solids"; ACS Appl. Mater. Interfac (2015).

* cited by examiner

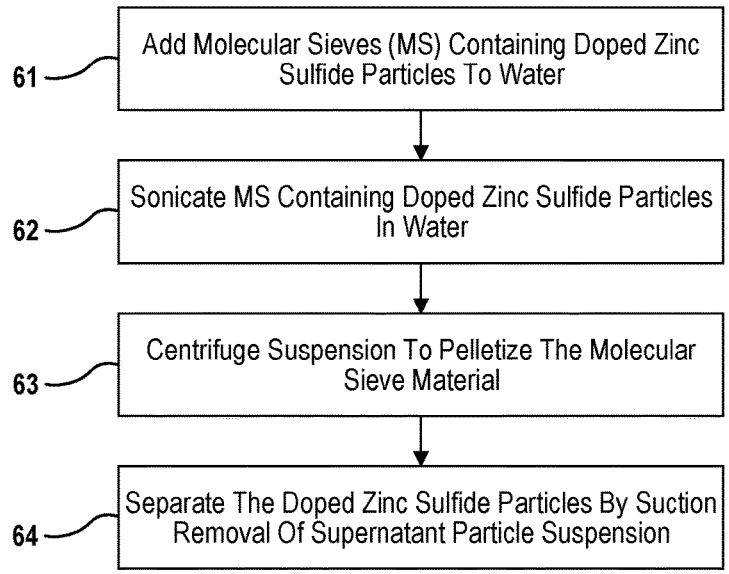
FIG. 5B
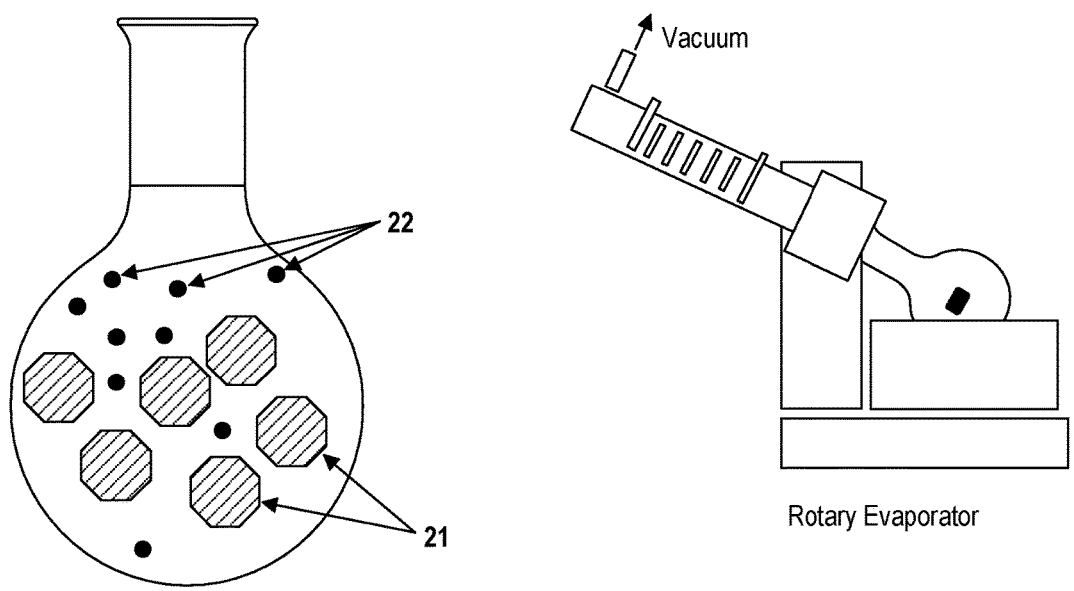
FIG. 6
FIG. 7

METHOD FOR STORING AND RELEASING NANOPARTICLES

FIELD

The present disclosure relates to techniques for storage of small particles and on-demand release of the same.

BACKGROUND

Nanomaterials have attracted a significant amount of scientific attention due to their unique properties. Because of these unique properties, nanoparticles are used in applications related to opto-electronics (such as light emitting devices and solar cells), medicine (such as drug delivery vehicles and diagnostic devices), energy storage, and environmental technologies (such as water purification).

Storage and handling of nanomaterials remains a major challenge due to the inherent instability of these materials. Due to the high surface to volume ratio, high surface reactivity, and other effects governing small particles such as Ostwald ripening, nanoparticle suspensions are prone to form aggregates and destabilize shortly after synthesis. A common solution to this problem is to add surfactants or stabilizing agents. High sensitivity of the stabilizing agents to temperature, pH and electrostatic effects make the storage and handling of nanoparticles complex and costly.

Addition of surfactants or stabilizers that modify the surface of the nanoparticles has major implications for the end application as well. For example, nanoparticles used for biomedical imaging or drug delivery applications often need to be functionalized in order to bind to specific target molecules or cells. These surfactants or capping agents can prevent or complicate the required surface functionalization. Another application area for nanoparticles is in opto-electronics. Capping agents and surfactants used during synthesis or as stabilizing agents, block or highly restrict the flow of electric charges across the particle boundaries. Complex post treatment processes, such as ligand exchange, are often necessary to impart the required electrical and optical properties to the nanoparticles in order to use them in light emitting devices and solar panels.

Therefore, it is desirable to develop a scalable, inexpensive, and environmentally-friendly method for long-term storage and on-demand release of nanoparticles without relying on the use of any additives.

This section provides background information related to the present disclosure which is not necessarily prior art.

SUMMARY

This section provides a general summary of the disclosure, and is not a comprehensive disclosure of its full scope or all of its features.

In one aspect, a method is provided for storing small particles in a host structure. The method includes: adding particles to a carrier material, where the particles are sized less than 100 micrometers; adding a host structure to the carrier material, where the host structure includes pores configured to receive the particles; and binding the particles to the host structure.

In some embodiments, the host structure is extracted from the carrier material while the particles remain associated with the host structure and the host structure is then stored in a container. In other embodiments, the host structure with the associated particles is stored in a liquid.

After storage, the particles can be released on demand from the host structure.

In one embodiment, the nanoparticles are stored by: dispersing nanoparticles into a primary solvent; inserting a host structure into the primary solvent, wherein the host structure is a solid phase comprised of a porous material sized to receive the nanoparticles; adsorbing the nanoparticles from the loading solvent onto or within the host structure; and storing the host structure with the adsorbed nanoparticles in a sealed container.

Further areas of applicability will become apparent from the description provided herein. The description and specific examples in this summary are intended for purposes of illustration only and are not intended to limit the scope of the present disclosure.

BRIEF DESCRIPTION OF THE SEVERAL VIEWS OF THE DRAWINGS

The drawings described herein are for illustrative purposes only of selected embodiments and not all possible implementations, and are not intended to limit the scope of the present disclosure.

FIG. 5B is a flowchart depicting a third example embodiment of releasing nanoparticles from a host structure;

FIG. 6 is a diagram of a solid phase matrix being added to a solvent;

FIG. 7 is a diagram of a solvent being rotary evaporated and thereby loading the nanoparticle onto the solid phase matrix.

Corresponding reference numerals indicate corresponding parts throughout the several views of the drawings.

DETAILED DESCRIPTION

Example embodiments will now be described more fully with reference to the accompanying drawings.

Figure 1A:
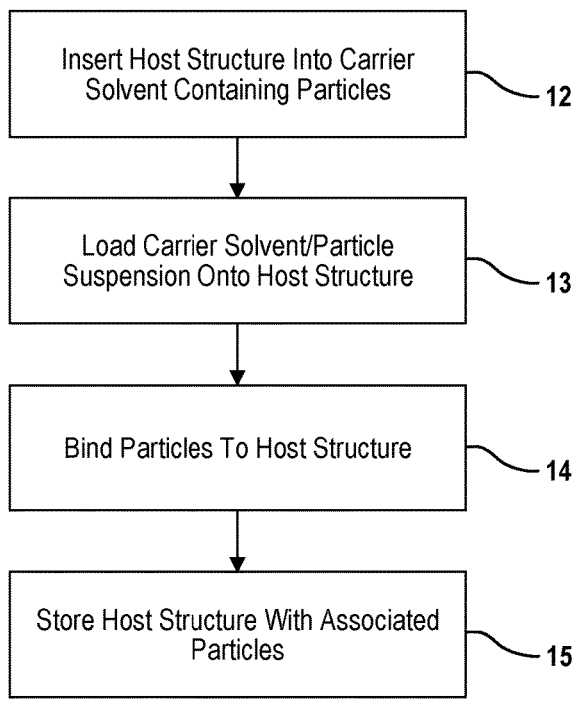
FIG. 1A is a flowchart of the method for storing nanoparticles in a host structure.

FIG. 1A provides an overview of a method for storing nanoparticles in a host structure. First, host structure material is inserted in a carrier material (e.g., liquid containing particles) at 12. Particles can be metals, metal alloys, metal chalcogenides, doped metal chalcogenides, polymers, elemental or combination semiconductors, carbon based particles, magnetic particles or combinations thereof. While reference is made throughout this disclosure to nanoparticles, the methods presented herein are suitable for any particles sized less than 100 micrometer.

In one example, particles are dispersed in a solvent to form a homogenous suspension (also referred to herein as the primary solvent). It is readily understood that primary solvents containing particles may be chosen from polar protic, polar aprotic and non-polar solvents. Example solvents include water, ethanol, isopropanol, and toluene. Other types of solvents also fall within the broader aspects of this disclosure. Carrier materials other than solvents are also contemplated by this disclosure.

Figure 2:
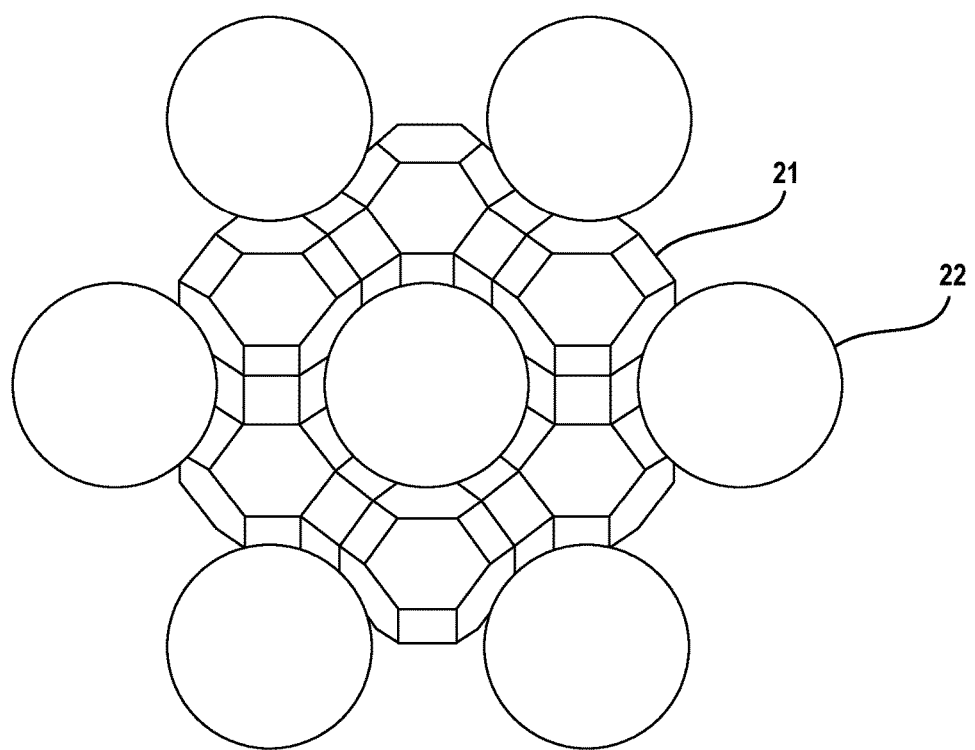
FIG. 2 is a diagram of an example host structure.

Next, the carrier material containing the particles is loaded into or onto a host structure as indicated at 13. The host structure is preferably a solid phase. The solid phase may be comprised of a porous material. The porous material includes pores configured to receive small particles (e.g. sized less than 100 micrometers). In one example, the host structure is a solid phase matrix 21 with particles 22 associated therewith as shown in FIG. 2. The host structure may also be in the form of pellets, powders, washcoats, membranes and natural or synthetic fibers. Example host structures include but are not limited to molecular sieves, silica, alumina, zeolites, cross-linked dextran, aerogel, xerogel, metal-organic frameworks, and ion exchange media (cationic, anionic and amphoteric).

The carrier material may be loaded into or onto the host structure in different ways. For example, the host structure may be inserted into the solvent containing the particles. The particles are then bonded at 14 with the host structure. In this example, the particles are bonded to the host structure by drying the solvent such that the particles adsorb into or onto the host structure. In this way, the carrier material is removed while the particles remain associated with the host structure. It is noted that the carrier material is loaded into the host structure without the use of a capping agent.

In another example, the host structure is caused to swell such that the particles enter the pores and then un-swelled to lock the particle in-situ. It is also envisioned that particles may be bonded or associated with the host structure by other methods including but not limited to ion exchange, covalent bonding, ionic bonding, polar covalent bonding, hydrogen bonding, electrostatic forces, formation of electrical double layer forces and Van der Waals forces may be used to integrate the particles in the matrix.

Prior to storage, the host structure with associated nanoparticles may need to be separated from the primary solvent. One method is to dry the host structure as noted above. Other separation techniques include centrifugation of the suspension, filtering the suspension, evaporating off the carrier liquid, freeze drying the suspension and/or gravity assisted settling and decanting the suspension. In other embodiments, the host structure with the associated nanoparticles, are stored in the primary solvent.

In any case, the host structure is preferably stored at 15 in a container. In one example, the host structure is stored in a vacuum sealed container. In another example, the host structure may be stored in an inert environment, such as inert gas or inert liquid. Other types of containers and storage environments are also contemplated by this disclosure. In any case, there is no need to use surfactants or stabilizing agents. It is envisioned that the host structure may be stored for short periods or long durations (e.g., months or years) without adverse effects.

Figure 1B:
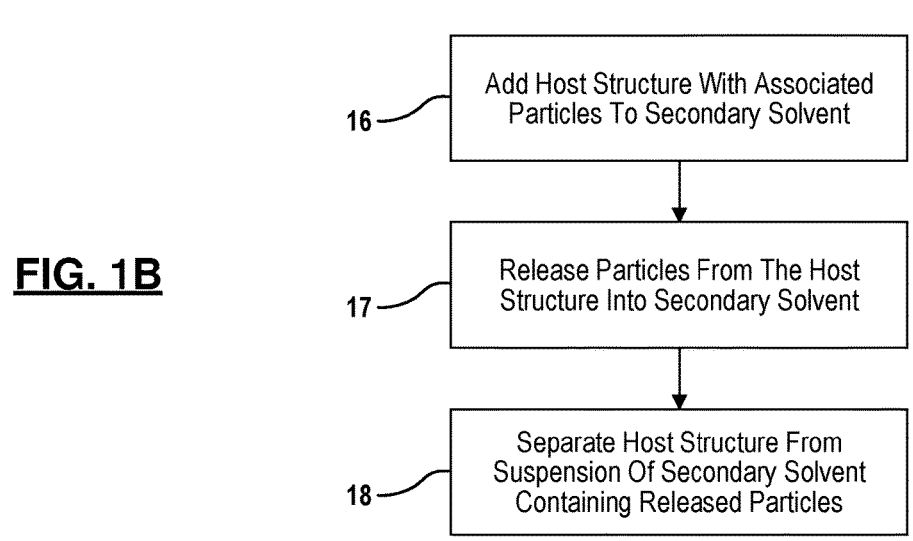
FIG. 1B is a flowchart of the method for releasing nanoparticles from a host structure.

Subsequently, the particles are released or disassociated from the host structure as shown in FIG. 1B. Different techniques can be used to release the particles from the host structure. In one example, the host structure with associated particles is placed in a secondary solvent at 16. The particles are released at 17 from the host structure into the secondary solvent, for example by sonication. The solvent may be the same or different than the original (primary) carrier solvent. The secondary solvent may be miscible or immiscible in the primary solvent. This feature is useful in readily transferring particles from one solvent into another desired solvent. The particles may also be released from the host structure using other physically agitating methods such as shaking, stirring, shearing, etc. Other mechanical or chemical techniques for releasing particles from the host structure include but are not limited to heating, cooling, treatment with reducing or oxidizing agents, hydrolysis, acid or base treatment, ion exchange, cleaving linkers by photocleavage, enzymatic cleavage, catalytic cleavage, dissolving the host structure in an etching solvent, swelling the host structure in order to allow particles to escape the pores, or using an electrostatic-based release mechanism.

Following the release of the particles into the secondary solvent, the host structure may be separated at 18 from the secondary solvent (which contains released particles) by centrifugation, filtration, gravity assisted settling and/or other mechanisms.

Three examples are described in order to demonstrate the disclosed method of storing small particles on a host structure (solid phase) and subsequently releasing them on demand. It is readily understood that the method can be extended to wide variety of particles, host structures and carrier solvents.

In a first example embodiment, cadmium selenide (CdSe)/cadmium sulfide (CdS) core-shell nanoparticles suspended in toluene (carrier material=primary solvent) are stored in a molecular sieve 13x host structure and subsequently released in water (secondary solvent) In order to store the nanoparticles, 2 grams of molecular sieve 13X (i.e., host structure 21) was added at 31 to the CdSe/CdS core/shell nanoparticle suspension in toluene as seen in FIG. 6. To load the CdSe/CdS nanoparticles (i.e., particles 22) into the pores of the molecular sieve, the mixture was stirred at 32 for an hour and then rotary evaporated at 33 to dryness as seen in FIG. 7. The dry powder was stored at 34 for two weeks in a sealed vial at room temperature.

Figure 3A:
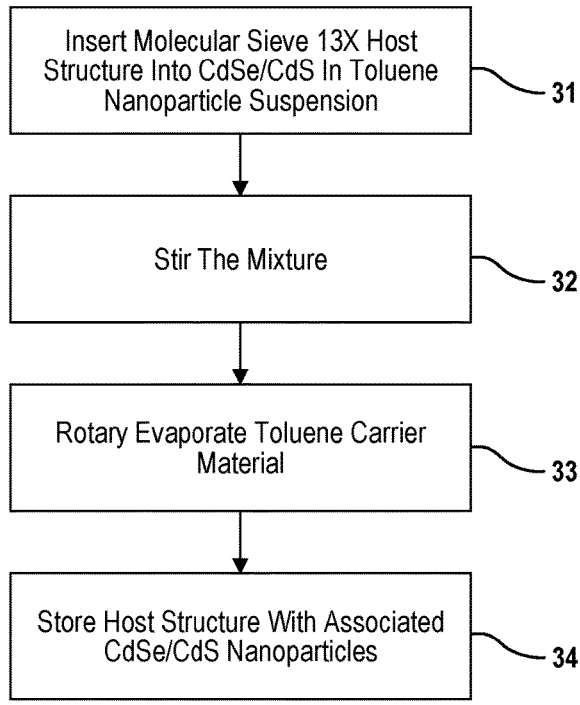
FIG. 3A is a flowchart depicting a first example embodiment of the method for storing nanoparticles in a host structure.
Figure 3B:
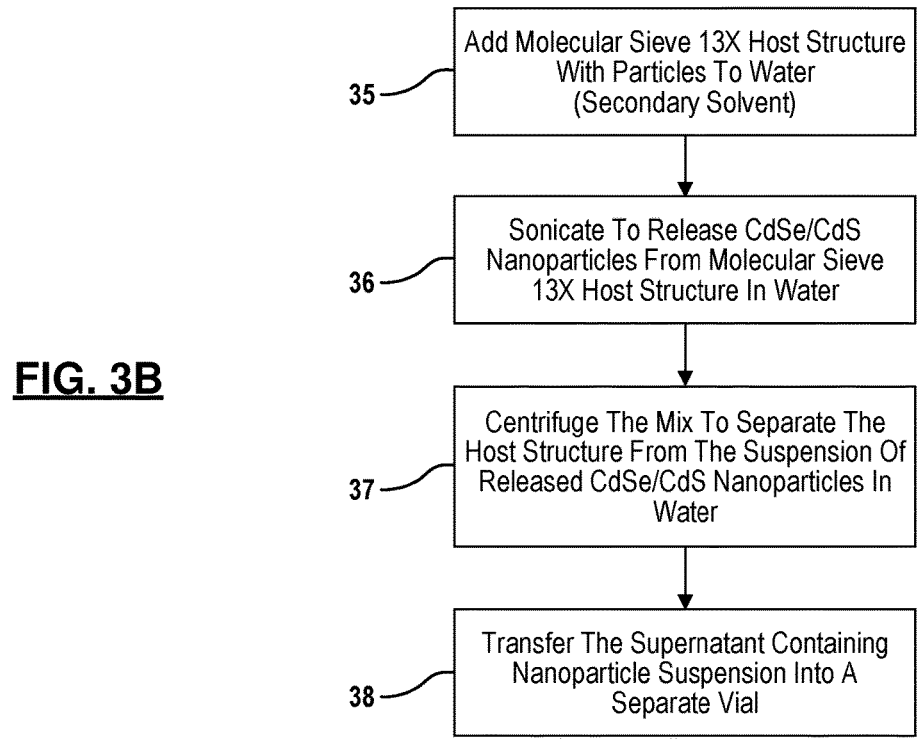
FIG. 3B is a flowchart depicting a first example embodiment of releasing nanoparticles from a host structure.
Figure 8:
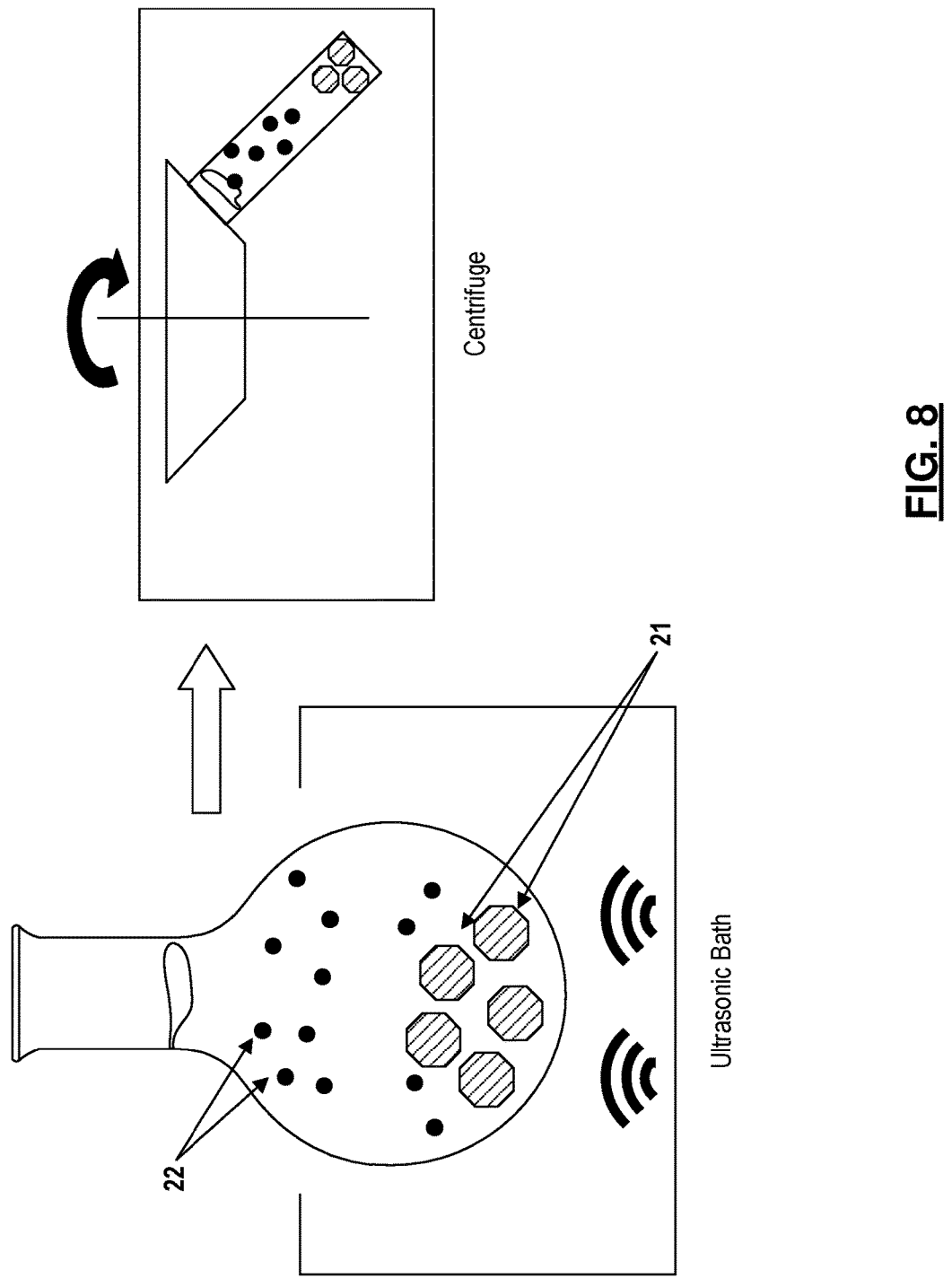
FIG. 8 is a diagram depicting the release of nanoparticles from the solid phase matrix by sonication and centrifuge.

Referring to FIG. 3B, the nanoparticles were later released from the molecular sieve into water to form a stable homogenous suspension. To do so, dry molecular sieve powder containing the nanoparticles was placed at 35 into a vessel containing distilled water and sonicated at 36 in a Branson 2800 ultrasonic bath for 10 minutes as seen in FIG. 8. The contents were then centrifuged at 37 for 3 minutes at 4000 rpm to separate the molecular sieve host structure from the water containing released nanoparticles. The supernatant is transferred into another vial at 38. The transparent water suspension containing the CdSe/CdS nanoparticles has a slight brown coloring and shows a strong red photoluminescence under 365 nm UV light that proves the presence of luminescent nanoparticles. Furthermore, the presence and size of nanoparticles released into water were confirmed and compared to the original sample using transmission electron microscopy (TEM).

Figure 4A:
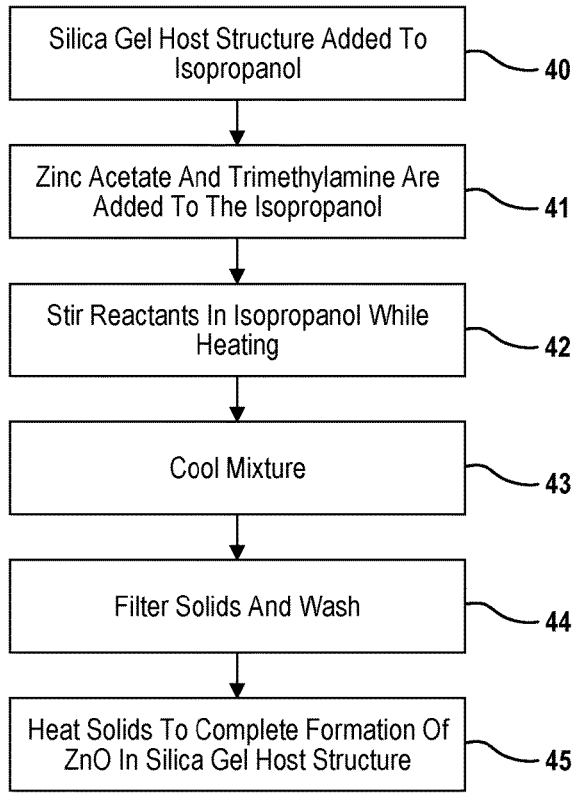
FIG. 4A is a flowchart depicting a second example embodiment of the method for storing nanoparticles in a host structure.

In a second example embodiment, zinc oxide (ZnO) nanoparticles are synthesized in-situ and stored in a silica gel host structure as described in relation to FIG. 4A. The primary (carrier) and secondary solvents are isopropanol and water, respectively. First, 2 g of silica gel was added at 40 to a flask containing 25 mL of isopropanol. While rapidly stirring, 4 mmol of zinc acetate was added at 41 to the flask and the mixture was heated at 80° C. for 1 hour. Triethylamine was added in excess molar ratio (40 mmol) to the reaction and the mixture was stirred at 42 with heating for 3 hours. After the mixture was cooled at 43, the solids were extracted at 44 by filtration and excess solvent was discarded. The solids were washed with fresh isopropanol followed by distilled water. The solid matrix was then heated to 110° C. overnight at 45 to convert any zinc hydroxide formed in the silica gel host structure to zinc oxide particles. Formation of ZnO nanoparticles was confirmed by X-ray diffraction (XRD).

Figure 4B:
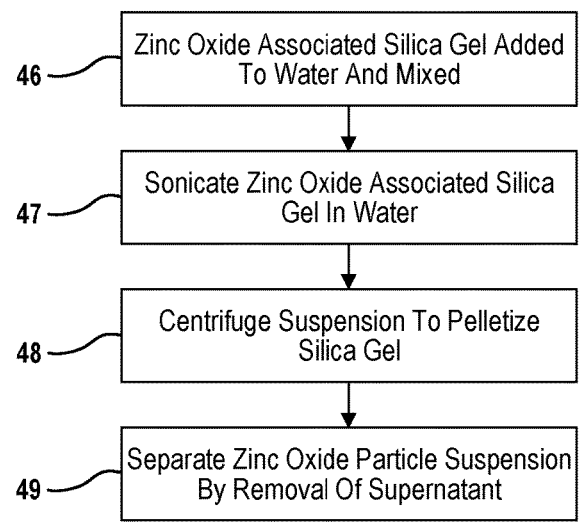
FIG. 4B is a flowchart depicting a second example embodiment of releasing nanoparticles from a host structure.

Referring to FIG. 4B, the nanoparticles were released from the silica gel host structure by dispersing the silica containing nanoparticles at 46 in distilled water (secondary solvent) and sonicating the mixture at 47 in a Branson 2800 ultrasonic bath for 10 minutes. As indicated at 48, the mixture was then centrifuged at 4000 rpm for 10 minutes to separate the solid matrix from the cloudy supernatant containing the released particles. The cloudy supernatant was further centrifuged at 14 kRPM. The supernatant containing the nanoparticles is collected at 49 in a separate vial. The presence of nanoparticles in the clear supernatant is confirmed by transmission electron microscopy (TEM).

Figure 5A:
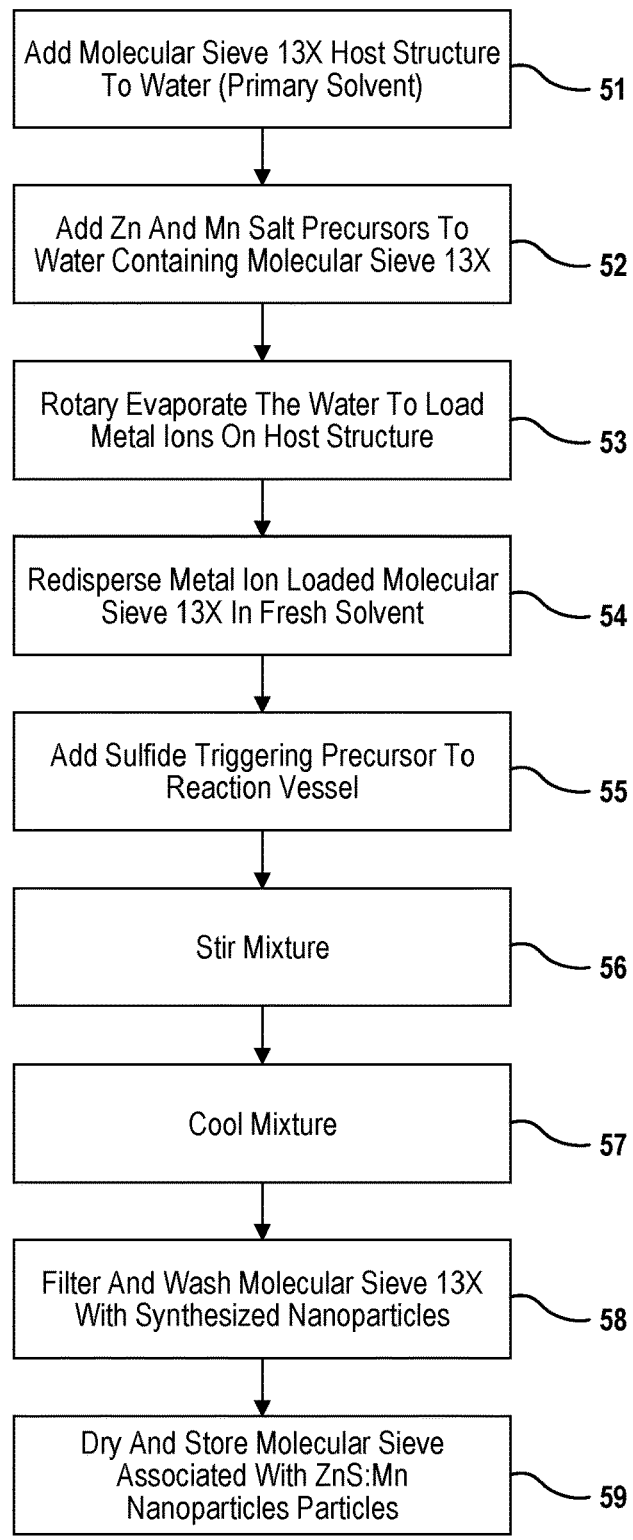
FIG. 5A is a flowchart depicting a third example embodiment of the method for storing nanoparticles in a host structure.

In the third example embodiment, zinc sulfide nanoparticles are simultaneously synthesized and stored in a molecular sieve host structure as described in FIG. 5A. To start, 8 g of molecular sieve 13X was added at 51 to a 250 mL flask containing 80 mL of distilled water and the mixture was rapidly stirred. 16 mL of a 1 M zinc acetate solution and 1.6 mL of 0.1 M manganese acetate solution were mixed together, added to the reaction flask and stirred at room temperature for 60 minutes as indicated at 52. The mixture of the metal ion precursors produces a 1% molar basis of Mn(II) dopant. Using a rotary evaporator the precursor solutions were dried at 53 onto the solid matrix at 68° C. to deposit the metal salts in the pores of the molecular sieves. The dry solids were transferred into another flask at 54 and 80 mL of distilled water was added to the reaction vessel. 16 mL of a 1 M sodium sulfide solution was added at 55 drop-wise to the reaction vessel with rapid stirring under nitrogen. As indicated at 56, the mixture was continuously stirred under nitrogen for 45 minutes at room temperature followed by an additional 60 minutes at 90° C. The mixture was then gradually cooled down to room temperature at 57. The solid matrix containing particles was filtered at 58 using a vacuum filtration system, and was washed with 25 mL of distilled water 5 times to remove any unreacted species. The washed solid was air dried and sealed in a glass vial at 59.

To release the ZnS:Mn nanoparticles formed in-situ, the host structure containing the nanoparticles was dispersed at 61 in 10 mL of distilled water (secondary solvent), and the suspension was sonicated at 62 in a Branson 2800 ultrasonic bath for 10 minutes. As indicated at 63, the mixture was then centrifuged at 4000 rpm for 10 minutes to separate the solid matrix from the cloudy supernatant containing the released particles. The cloudy supernatant was further centrifuged at 14 k RPM. The supernatant containing the nanoparticles is collected at 64 in a separate vial. The presence of nanoparticles in the clear supernatant is confirmed by electron microscopy (TEM). Nanoparticles were also released in ethanol, DMSO and acetonitrile as secondary solvents. The presence and dispersity of nanoparticles were confirmed by fluorescence spectroscopy and transmission electron microscopy (TEM).

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for storing small particles in a host structure, comprising:

adding particles to a carrier material, where the particles are sized less than 100 micrometers;
adding a host structure to the carrier material;
binding the particles to the host structure;
storing the host structure with the bound particles; and
subsequently releasing the particles intact from the host structure using sonication.

2. The method of claim 1 wherein the carrier material is a liquid and the host structure of is further defined as a solid phase matrix.

3. The method of claim 1 wherein the host structure includes pores that are less than 100 micrometers.

4. The method of claim 1 further comprises binding the particles to the host structure by adsorbing the particles into pores of the host structure.

5. The method of claim 1 further comprises binding the particles to the host structure by one of adsorption, ion exchange, covalent bonding, ionic bonding, polar covalent bonding, hydrogen bonding, electrostatic forces, formation of electrical double layer forces and Van der Waals forces.

6. The method of claim 1 further comprises
extracting the host structure from the carrier material while the particles remain bound with the host structure; and
storing the host structure in a container.

7. The method of claim 1 further comprises storing the host structure with the bound particles in a liquid.

8. The method of claim 1 further comprises releasing the particles from the host structure into a secondary solvent, where the secondary solvent is different from the carrier material.

9. The method of claim 1 wherein the particles are selected from the group consisting of metals, metal alloys, metal chalcogenides, doped metal chalcogenides, polymers, elemental or combination semiconductors, carbon based particles, magnetic particles or combinations thereof.

10. The method of claim 1 wherein the particles are selected from the group consisting of metal chalcogenides and doped metal chalcogenides.

11. A method for storing nanoparticles in a host structure, comprising:
dispersing nanoparticles into a primary solvent;
inserting a host structure into the primary solvent, wherein the host structure is a solid phase comprised of a porous material sized to receive the nanoparticles;
adsorbing the nanoparticles from the primary solvent onto or within the host structure;
separating the host structure from the primary solvent;
storing the host structure with the adsorbed nanoparticles in a sealed container; and
releasing the nanoparticles intact from the host structure into a secondary solvent after the step of storing the host structure with the adsorbed nanoparticles in a sealed container.

12. The method of claim 11 wherein the primary solvent is selected from a group consisting of nonpolar solvents, polar protic solvents and polar aprotic solvents.

13. The method of claim 11 wherein host structure is selected from a group consisting of molecular sieves, silica, alumina, zeolites, cross-linked dextran, aerogel, xerogel, metal-organic frameworks and ion exchange media.

14. The method of claim 11 where the host structure is one of pellets, powders, washcoats, membranes, natural fibers or synthetic fibers.

15. The method of claim 11 further comprises adsorbing the nanoparticles from the primary solvent onto or within the host structure without the use of a capping agent.

16. The method of claim 11 wherein separating the host structure from the primary solvent is achieved by evaporation.

17. The method of claim 11 further comprises releasing the nanoparticles intact from the host structure into the secondary solvent using sonication.

18. The method of claim 11 further comprises releasing the nanoparticles intact from the host structure into the secondary solvent using one of agitation, shearing, shaking or stirring.

19. The method of claim 11 further comprises separating the host structure from the secondary solvent after releasing the nanoparticles intact from the host structure.

20. The method of claim 19 wherein the host structure is separated from the secondary solvent by centrifugation.

21. The method of claim 19 wherein the host structure is separated from the secondary solvent by filtration.

22. The method of claim 19 wherein the host structure is separated from the secondary solvent by gravity assisted settling and extracting supernatant.

23. The method of claim 11 wherein the particles are selected from the group consisting of metals, metal alloys, metal chalcogenides, doped metal chalcogenides, polymers, elemental or combination semiconductors, carbon based particles, magnetic particles or combinations thereof.

24. The method of claim 11 wherein the particles are selected from the group consisting of metal chalcogenides and doped metal chalcogenides.

25. The method of claim 24 wherein the particles are released from the host structure by one of sonication, shaking, stirring, or shearing.

* * * * *

UNITED STATES PATENT AND TRADEMARK OFFICE
CERTIFICATE OF CORRECTION

PATENT NO. : 10,259,999 B2
APPLICATION NO. : 15/240271
DATED : April 16, 2019
INVENTOR(S) : Hashem Akhavan-Tafti et al.

Page 1 of 1

It is certified that error appears in the above-identified patent and that said Letters Patent is hereby corrected as shown below:

On the Title Page

Item [56], Column 2, Line 19, delete "stablization" and insert --stabilization-- therefor.

Item [56], Column 2, Line 33, delete "chemistry",Oxford" and insert --chemistry", Oxford-- therefor.

In the Claims

Column 7, Claim 6, Line 21, after "comprises", insert --:-- therefor.

Signed and Sealed this
Second Day of July, 2019

Andrei Iancu
*Director of the United States Patent and Trademark Office*